(12) United States Patent
Ma et al.

(10) Patent No.: US 10,481,808 B1
(45) Date of Patent: *Nov. 19, 2019

(54) BLOCK CACHING IN A SHARED STORAGE ENVIRONMENT

(71) Applicant: EMC IP Holding Company LLC, Hopkinton, MA (US)

(72) Inventors: Gang Ma, West Roxbury, MA (US); Sorin Faibish, Newton, MA (US); Percy Tzelnic, Concord, MA (US); James M. Pedone, Jr., West Boylston, MA (US)

(73) Assignee: EMC IP Holding LLC, Hopkinton, MA (US)

( * ) Notice: Subject to any disclaimer, the term of this patent is extended or adjusted under 35 U.S.C. 154(b) by 14 days.

This patent is subject to a terminal disclaimer.

(21) Appl. No.: 15/585,771

(22) Filed: May 3, 2017

Related U.S. Application Data

(63) Continuation of application No. 13/717,004, filed on Dec. 17, 2012, now Pat. No. 9,672,151.

(51) Int. Cl.
*G06F 3/06* (2006.01)
*G06F 12/0808* (2016.01)
*G06F 12/0888* (2016.01)

(52) U.S. Cl.
CPC .......... *G06F 3/0619* (2013.01); *G06F 3/0665* (2013.01); *G06F 3/0679* (2013.01);
(Continued)

(58) Field of Classification Search
CPC .... G06F 3/0619; G06F 3/0665; G06F 3/0679; G06F 12/0808; G06F 12/0888; G06F 2212/6046; G06F 2212/69
See application file for complete search history.

(56) References Cited

U.S. PATENT DOCUMENTS 6,219,693 B1 4/2001 Napolitano et al.
6,453,354 B1 * 9/2002 Jiang ................. G06F 17/30171
707/E17.01
(Continued)

OTHER PUBLICATIONS

EMC Corporation, "Server Flash Cache for Superior Performance, Intelligence, and Protection of Mission-Critical Data," May 2012, 3 pages.
(Continued)

*Primary Examiner* — Reginald G Bragdon
*Assistant Examiner* — Edward Wang
(74) *Attorney, Agent, or Firm* — Ryan, Mason & Lewis, LLP (57) ABSTRACT

A storage system comprises a shared storage environment that includes a storage array having at least one storage volume shared between first and second host devices. The storage system further comprises a server associated with the storage array, at least first and second clients associated with the respective first and second host devices, and a first block cache arranged between the first client and the storage array. The server is configured to coordinate operations of the first and second clients relating to the storage volume shared between the first and second host devices in a manner that ensures coherency of data stored in the first block cache. The server may comprise a storage block mapping protocol (SBMP) server and the first and second clients may comprise respective SBMP clients. The block cache is illustratively implemented using a VFCache or other type of server flash cache.

20 Claims, 4 Drawing Sheets

(52) U.S. Cl.
CPC ...... *G06F 12/0808* (2013.01); *G06F 12/0888* (2013.01); *G06F 2212/6046* (2013.01); *G06F 2212/69* (2013.01)

(56) References Cited

U.S. PATENT DOCUMENTS

| | | | |
|---|---|---|---|
| 7,315,926 | B2 | 1/2008 | Fridella et al. |
| 7,552,223 | B1 | 6/2009 | Ackaouy et al. |
| 7,617,216 | B2 | 11/2009 | Fridella et al. |
| 7,620,671 | B2 | 11/2009 | Jiang et al. |
| 7,653,832 | B2 | 1/2010 | Faibish et al. |
| 7,865,485 | B2 | 1/2011 | Mullick et al. |
| 7,945,726 | B2 | 5/2011 | Faibish et al. |
| 8,086,585 | B1 | 12/2011 | Brashers et al. |
| 8,473,690 | B1 * | 6/2013 | Condict ............... G06F 12/0815 711/141 |
| 2003/0212752 | A1 | 11/2003 | Thunquest et al. |
| 2005/0251500 | A1 | 11/2005 | Vahalia et al. |
| 2011/0072069 | A1 | 3/2011 | Pirzada et al. |

OTHER PUBLICATIONS

EMC Corporation, "Meeting the Needs of the Most-Demanding Applications with the World's Best NAS Performance," EMC Celerra Multi-Path File System (MPFS), Nov. 2009, 4 pages.

EMC Corporation, "Using VNX Multi-Path File System, P/N 300-013-460 Rev. 01," EMC VNX Series, Release 7.1, Jul. 2012, 64 pages.

EMC Corporation, "Introduction to EMC VFCache," White Paper, Feb. 2012, 31 pages.

Cluster File Systems, Inc., "Lustre: A Scalable, High-Performance File System," Nov. 2002, 13 pages.

Feiyi Wang et al., "Understanding Lustre Filesystem Internals," Tech Report: ORNL/TM-2009/117, Apr. 2010, 95 pages.

* cited by examiner

BLOCK CACHING IN A SHARED STORAGE ENVIRONMENT

RELATED APPLICATION

The present application is a continuation of U.S. patent application Ser. No. 13/717,004, filed Dec. 17, 2012 and entitled "Block Caching Between a Host Device Client and a Storage Array in a Shared Storage Environment," the disclosure of which is incorporated by reference herein.

FIELD

The field relates generally to data storage, and more particularly to techniques for accelerating performance of input-output operations in storage systems.

BACKGROUND

A number of techniques are known for accelerating input-output (TO) performance of storage systems. Such arrangements may involve the use of various block caching approaches. Unfortunately, conventional block caching can be problematic in a number of different respects. For example, in some conventional systems, block caching is implemented in a Linux kernel or other operating system kernel of an associated host computer or other host device, and is therefore limited in both size and functionality.

Also, block caching can be particularly difficult to implement in shared storage environments, such as share-disk environments or cluster environments. The problems in this context include maintaining coherency in data blocks cached from a shared storage resource as well as recovering from failures.

As a more particular illustration, in one type of cluster environment each of the sites of a multi-site system may replicate file systems associated with the other sites, so as to provide file system recovery capability in the event of failure of one or more of the sites. However, conventional arrangements are often unable to provide active-active data access in both primary and replicated file systems, where "active-active" indicates that both primary and replicated file systems of a given site are mounted as read-write file systems.

Similar problems arise in the above-noted share-disk environments as well as other types of shared storage environments.

Accordingly, there is a need for improvements in block caching techniques, particularly in shared storage environments.

SUMMARY

Illustrative embodiments of the present invention provide storage systems that implement block caching functionality for one or more host devices that access a shared storage environment, in a manner that can provide substantial improvement in IO performance relative to conventional arrangements.

In one embodiment, a storage system comprises a shared storage environment that includes a storage array having at least one storage volume shared between first and second host devices. The storage system further comprises a server associated with the storage array, at least first and second clients associated with the respective first and second host devices, and a first block cache arranged between the first client and the storage array. The server is configured to coordinate operations of the first and second clients relating to the storage volume shared between the first and second host devices in a manner that ensures coherency of data stored in the first block cache.

The server may comprise a storage block mapping protocol (SBMP) server and the client may comprise an SBMP client, with the SBMP server and the SBMP client being configured to communicate using a file mapping protocol.

The block cache is illustratively implemented using a VFCache or other type of server flash cache.

One or more of the illustrative embodiments described herein exhibit enhanced performance relative to conventional arrangements. For example, these arrangements can provide acceleration of IO operations between a client and a storage array, thereby optimizing storage system performance. Also, disadvantages that could otherwise arise when performing caching in a Linux kernel or other operating system kernel of an associated host device are avoided.

DETAILED DESCRIPTION

Illustrative embodiments of the present invention will be described herein with reference to exemplary storage systems and associated computers, servers, storage devices and other processing devices. It is to be appreciated, however, that the invention is not restricted to use with the particular illustrative system and device configurations shown. Accordingly, the term "storage system" as used herein is intended to be broadly construed, so as to encompass, for example, enterprise storage systems, physical or virtual data centers, private or public cloud systems distributed over multiple geographically-dispersed locations, as well as other types of storage systems comprising one or more sites.

Figure 1:
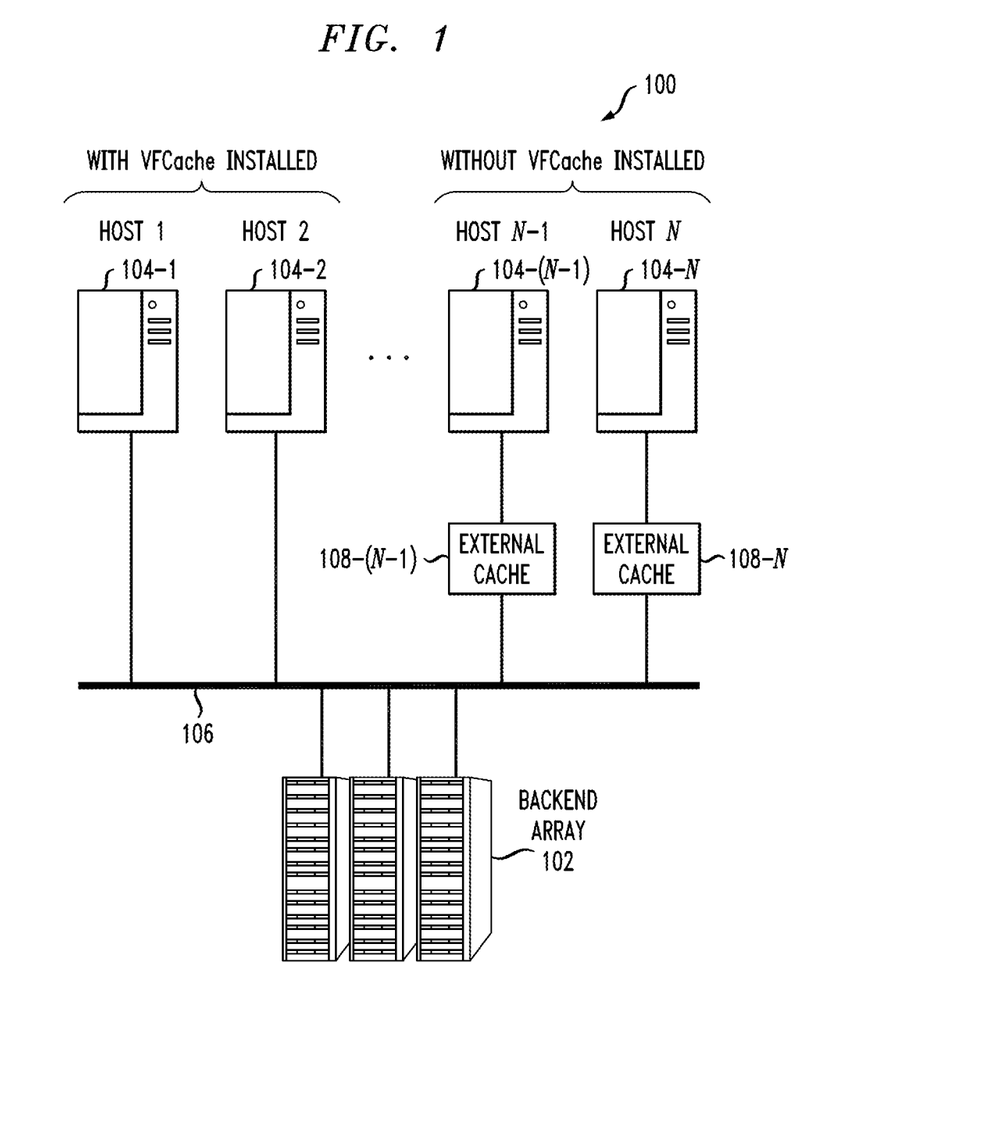
FIG. 1 shows a storage system that implements block caching in a shared storage environment in an illustrative embodiment of the invention.

FIG. 1 shows a storage system 100 configured in accordance with an illustrative embodiment of the present invention. The storage system 100 comprises a storage array 102 and a plurality of host devices 104-1, 104-2, . . . 104-N that share the storage array 102. The host devices 104 are also denoted as Host 1, Host 2, . . . Host N. Each such host device accesses the storage array 102 via one or more networks 106. The storage array 102 in the present embodiment is also referred to as a backend array.

A first subset of the host devices 104 including at least host devices 104-1 and 104-2 have internal block caching functionality via respective installed VFCache caches to be described in greater detail below. Accordingly, a given block cache in the FIG. 1 embodiment comprises an internal cache of its corresponding host device. Although this internal cache is illustratively implemented using a VFCache in the present embodiment, other embodiments may utilize other types of block caches.

A second subset of the host devices 104 including at least host devices 104-(N−1) and 104-N do not have internal block caching functionality and are without installed VFCache caches but instead utilize respective external caches 108-(N−1) and 108-N. The external caches 108 are coupled between their respective hosts and the storage array 102.

One or both of the first and second subsets of host devices 104 may each include one or more additional host devices.

The storage array 102 may be viewed as an example of what is more generally referred to herein as a "shared storage environment." It is assumed to comprise at least one storage volume shared between first and second ones of the host devices 104. At least one of these host devices includes a block cache illustratively implemented using the above-noted VFCache. Other examples of shared storage environments include share-disk environments and cluster environments, each of which generally comprises one or more storage arrays having at least one storage volume shared between multiple host devices. The term "storage array" as used herein is intended to be broadly construed, so as to encompass a wide variety of different arrangements of storage devices or other storage resources.

In the present embodiment, a server is associated with the storage array 102, and at least first and second clients are associated with the respective first and second host devices 104-1 and 104-2. Examples of these server and client elements are described in greater detail in conjunction with FIG. 2. First and second block caches are arranged between respective ones of the first and second clients and the storage array 102. The server is configured to coordinate operations of the first and second clients relating to the storage volume shared between the first and second host devices 104-1 and 104-2 in a manner that ensures coherency of data blocks stored in the first and second block caches. One or more additional block caches may be associated with other clients of the host devices 104 in the subset of those devices that incorporate internal block caching functionality.

As noted above, the block caches implemented in the host devices having internal block caching functionality in the present embodiment are assumed to be implemented using a server flash cache, and more particularly a VFCache commercially available from EMC Corporation of Hopkinton, Mass. The VFCache provides enhanced functionality for performing high-speed block read and write operations to an associated storage array while also providing data integrity protection. Additional details regarding VFCache can be found in EMC Corporation, "Introduction to EMC VFCache," White Paper, No. H10502.1, February 2012, pp. 1-31, which is incorporated by reference herein. Other types of server flash cache may be used in other embodiments. It is also possible to utilize block caches that are based on fast memory types other than flash memory.

In the case of a block cache comprising a VFCache, it should be noted that VFCache is a read-enabled, write-through cache that is typically not supported in shared storage environments such as share-disk environments and active-active cluster environments. This is due at least in part to the fact that VFCache does not include lock granting and revocation mechanisms. Embodiments of the invention are configured to allow VFCache or other types of block caching arrangements that do not include such mechanisms to nonetheless be used effectively in shared storage environments.

In the present embodiment, the above-noted server associated with the storage array 102 more particularly comprises a storage block mapping protocol (SBMP) server and the first and second clients associated with respective host devices 104-1 and 104-2 comprise respective SBMP clients. Examples of SBMP server and client elements can be found in U.S. Pat. No. 7,653,832, entitled "Storage Array Virtualization Using a Storage Block Mapping Protocol Client and Server," and U.S. Pat. No. 7,945,726, entitled "Pre-allocation and Hierarchical Mapping of Data Blocks Distributed from a First Processor to a Second Processor for Use in a File System," both of which are commonly assigned herewith and incorporated by reference herein. SBMP servers and clients may be configured to communicate with one another using a file mapping protocol (FMP) or an extension of such a protocol. However, in other embodiments, other types of servers and clients may be used.

The SBMP server used in the present embodiment ensures data coherency in the block caches of the host devices in a manner that permits the use of VFCache in the shared storage environment. For example, the SBMP server can perform functions such as processing IO requests from client applications so as to lock particular data ranges of the shared storage environments for particular clients associated with respective host devices. It generally controls granting and revocation of such locks responsive to client IO requests in a manner that ensures data coherency in the block caches, as will be described in greater detail below in conjunction with FIG. 2.

System elements such as SBMP servers and clients may be implemented on respective host computers or other processing devices having processor, memory and network interface components. For example, a given such processing device may implement an SBMP server, or one of the SBMP clients and its associated block cache. An example of a processing platform comprising a networked arrangement of multiple such processing devices will be described below in conjunction with FIG. 4. A given processing device memory as disclosed herein may be viewed as an example of what is more generally referred to as a "computer program product" storing executable computer program code.

It should also be appreciated that the above-noted servers, clients and block caches may each be implemented at least in part in the form of software that is stored in a memory of a processing device and executed by a processor of that processing device. Also, a given such processing device memory may be viewed as comprising storage elements of a corresponding one of the block caches.

A given one of the SBMP clients communicates over a first path with an SBMP server implemented in an array controller of the storage array 102, and communicates directly with the storage array 102 over a second path that passes through the corresponding block cache but bypasses the array controller.

Thus, the given SBMP client 206 can perform file operations over the first path via the SBMP server. Such file operations may comprise, for example, obtaining file layout information over the first path via the SBMP server. Other examples of information obtained via file operations over the first path include file names, directory structures, and access permissions.

Also, the given SBMP client can perform IO operations with the storage array over the second path such that the IO operations are subject to block caching in the corresponding block cache.

The IO operations will generally include both read and write operations. A read operation performed by a given SBMP client involves first attempting to read a data block from the corresponding block cache and only reading the data block from the storage array 102 if the data block is not available in the block cache. A write operation performed by the given SBMP client involves writing a data block to the storage array 102 and caching the data block in the corresponding block cache.

The SBMP server may provide notifications to the given SBMP client when one or more other SBMP clients have written to data blocks that are cached in the block cache of the given SBMP client. The given SBMP client 206 is configured to respond to such a notification by invalidating the appropriate data block or data blocks in its corresponding block cache.

In addition, the SBMP clients may be configured to invalidate contents of their respective block caches under designated failure conditions. Each block cache may also be configured to automatically retrieve valid data from the storage array 102 upon restart of its corresponding client after a given failure condition. This will help to reduce client recovery latency.

Another illustrative embodiment of a storage system 200 is shown in FIG. 2. In this embodiment, the storage system 200 comprises a storage array 202 that includes multiple logical units or LUs 203-0, 203-1, . . . 203-L. Although shown as part of a single storage array 202 in the figure, the logical units 203 may alternatively comprise portions of one or more separate storage arrays.

Figure 2A:
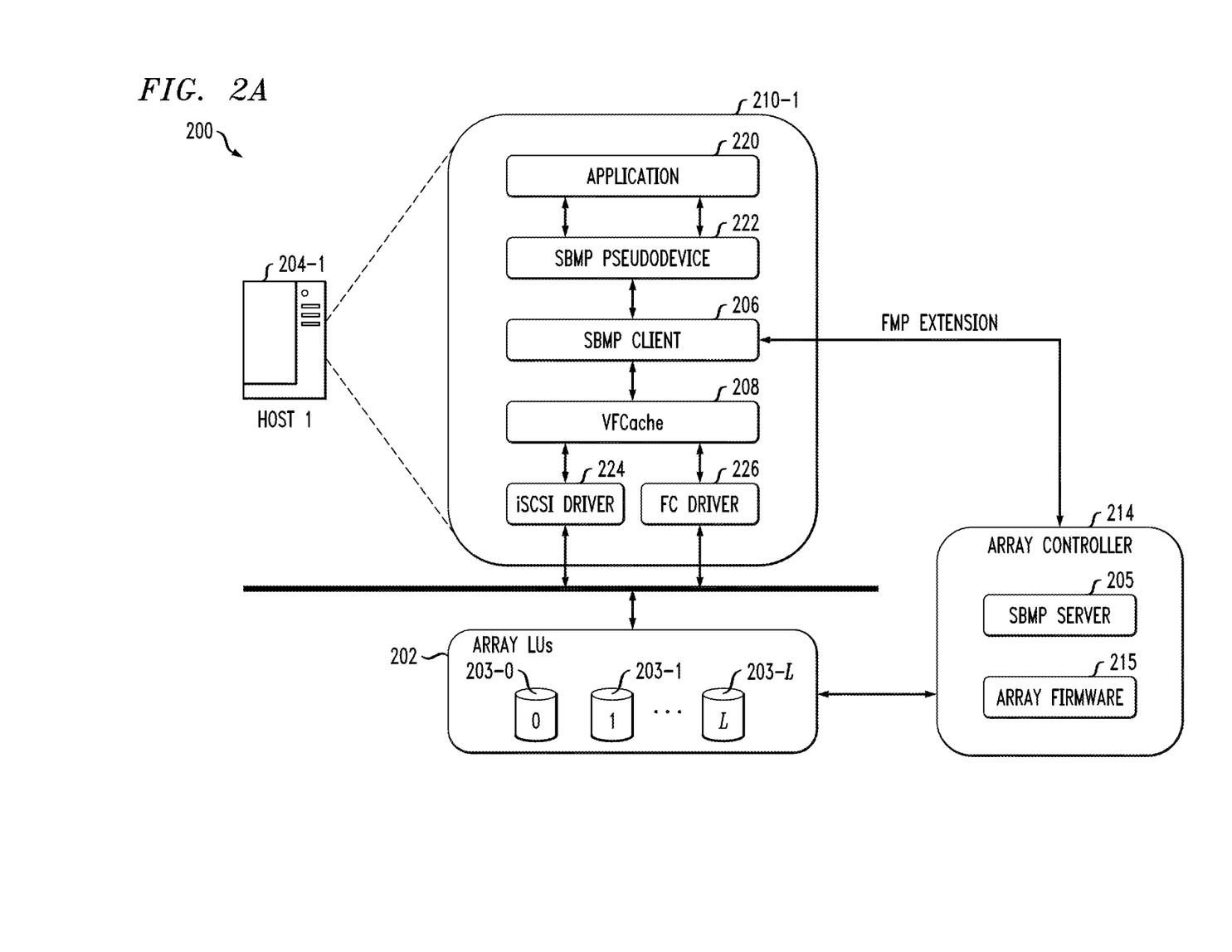
FIGS. 2A and 2B show respective portions of another embodiment of a storage system including a host device with block caching functionality and a host device without block caching functionality. These figures are collectively referred to herein as FIG. 2.
Figure 2B:
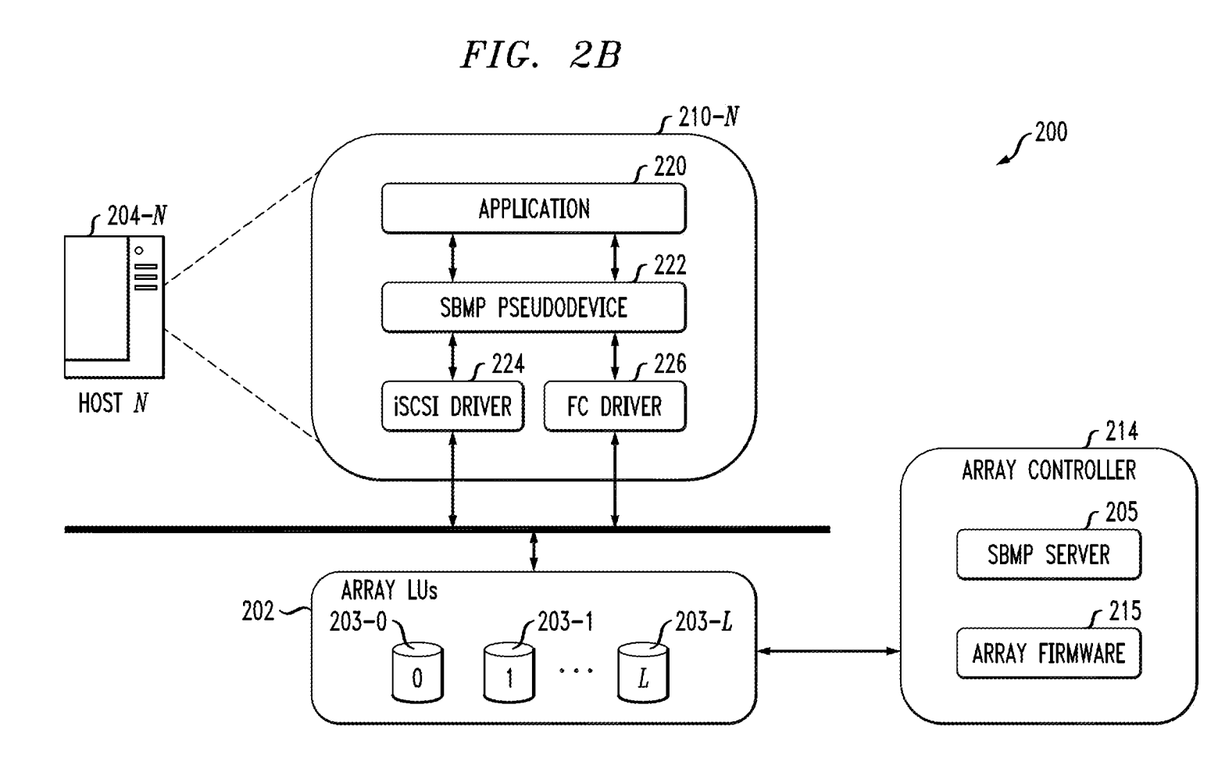

In the FIG. 2A portion, a first host device 204-1 is illustrated in greater detail. This host device includes internal block caching functionality, and may be viewed as corresponding to host device 104-1 with installed VCache in the FIG. 1 embodiment. In the FIG. 2B portion, another host device 204-N is illustrated in greater detail. This host device does not include internal block caching functionality, and may be viewed as corresponding to host device 104-N without installed VCache in the FIG. 1 embodiment. Both FIGS. 2A and 2B illustrate the same storage array 202 comprising a storage environment that includes at least one storage volume shared by the first and second host devices 104-1 and 104-N and possibly additional host devices not explicitly shown, some of which may have internal block caching functionality and others of which may not have such functionality.

By way of example, the storage array 202 may comprise storage products such as VNX and Symmetrix® VMAX, both commercially available from EMC Corporation of Hopkinton, Mass. A variety of other storage products may be utilized to implement at least a portion of the logical units 203.

Referring now more particularly to FIG. 2A, the system 200 comprises an SBMP server 205, an SBMP client 206 and a VFCache 208. The SBMP client 206 is implemented in a module 210-1 associated with the host device 204-1. The module 210-1 includes internal block caching functionality provided by the VFCache 208 which is arranged in a first path between the SBMP client 206 and the storage array 202. As indicated previously, the storage array 202 as shown comprises L+1 logical units denoted 203-0 through 203-L.

The SBMP client 206 communicates via a second path with the SBMP server 205 which is implemented in an array controller 214 comprising array firmware 215. The second path in this embodiment uses an FMP extension as indicated in the figure.

The array controller 214 may be viewed as a component of a network file system. The term "network file system" is intended to encompass, by way of example, network file systems known as NFS and CIFS, where CIFS denotes Common Internet File System, as well as other types of network file systems. The term is therefore used in a general sense herein and should not be construed as being limited to any particular type of network file system. A given such network file system may but need not involve use of one or more network attached storage (NAS) protocols.

The module 210-1 further comprises an application 220 associated with an SBMP pseudodevice 222 that is coupled to the SBMP client 206. Also included in the module 210-1 are multiple block IO drivers, including an Internet Small Computer System Interface (iSCSI) driver 224 and a Fibre Channel (FC) driver 226, both coupled between the VFCache 208 and the storage array 202. In other embodiments, only one of the drivers 224 and 226 may be included, or other types of drivers may be used. Although the module 210-1 is shown only for host device 204-1 in FIG. 2A, it is assumed that one or more additional host devices of system 200 are similarly configured with internal block caching functionality and accordingly will comprise a module such as module 210-1 that includes an SBMP client, a VFCache, one or more block IO drivers and possibly other elements.

As previously described in conjunction with the FIG. 1 embodiment, not all host devices of a given storage system are necessarily configured to include internal block caching functionality. For example, FIG. 2B illustrates host device 204-N, which is configured in a manner similar to host device 204-1 but without an SBMP client 206 and a VFCache 208. Thus, host device 204-N comprises a module 210-N that includes application 220, SBMP pseudodevice 222, iSCSI driver 224 and FC driver 226, arranged as previously described in the context of module 210-1 of FIG. 2A. It is assumed that one or more additional host devices of system 200 are similarly configured without internal block caching functionality and accordingly will comprise a module such as module 210-N that does not include an SBMP client 206 or an associated VFCache 208.

In alternative embodiments, host devices such as host device 204-N without internal block caching functionality may nonetheless include an SBMP client such as SBMP client 206. Also, the term "client" as used herein is intended to be broadly construed, such that, for example, in the context of FIG. 2B, may encompass SBMP pseudodevice 222. Thus, such a pseudodevice may be considered an example of a client as that term is broadly used herein. Numerous other types of clients may be used. The term "client" should be understood to include, for example, one or more software entities implemented in a given host device that interact with a corresponding server such as an SBMP server so as to ensure data coherency for block caching in a shared storage environment.

The SBMP server 205 implemented in array controller 214 is configured to coordinate operations of at least first and second clients relating to the storage volume shared between the corresponding host devices 204 in a manner that ensures coherency of data blocks stored in the VFCache 208 of host device 204-1. The first client in this embodiment is assumed to comprise the SBMP client 206 of host device 204-1, and the second client may comprise an SBMP client in another host device that is configured with internal block caching functionality, or a related device such as an SBMP pseudodevice in another host device that is not configured with internal block caching functionality.

By way of example, the SBMP server 205 may be configured to grant locks on particular data blocks in the shared storage volume to only one of the first and second clients at a time responsive to lock requests from those clients. Thus, the SBMP server 205 may receive from the SBMP client 206 a lock request for a first range of data blocks in the shared storage volume of the storage array 202, and grant a lock on the first range of data blocks to the SBMP client 206 responsive to its lock request. The SBMP client 206 stores the first range of data blocks in the VFCache 208 and accesses those data blocks from the VFCache 208 as long as its granted lock on the first range of data blocks remains valid.

The SBMP server 205 may subsequently receive from a second client other than SBMP client 206 a lock request for a second range of data blocks in the shared storage volume, where the second range of data blocks at least partially encompasses the first range of data blocks for which a lock has already been granted to SBMP client 206. In such a situation, the SBMP server 205 may notify the SBMP client 206 that its lock on the first range of data blocks is revoked, and grant a lock on the second range of data blocks to the second client responsive to the lock request from the second client.

The SBMP server 205 operates in a similar manner with respect to other VFCache caches 208 implemented in other ones of the host devices 204, so as to ensure coherency of data stored in all of the VFCache caches.

As more particular examples, consider the following cases that further illustrate the operation of the FIG. 2 embodiment.

Case 1. Two host devices A and B share a disk of storage array 202 and both host devices have VFCache installed. In this case the SBMP server 205 coordinates data access using the SBMP clients 206 in the respective host devices. Accordingly, if host device A intends to overwrite data on the shared disk which also currently resides in the VFCache of host device B, the SBMP server 205 will send a notification to the SBMP client 206 in host device B revoking the conflicting data in the VFCache of that device. Host device A can then safely overwrite the corresponding data on the shared disk.

Case 2. Two host devices A and B 204 share a disk of storage array 202 and host device A has VFCache installed but host device B does not have VFCache installed. In this case the SBMP server 205 again coordinates data access among host device clients, but only host device A includes an SBMP client 206. Accordingly, if host device B intends to overwrite data on the shared disk which also currently resides in the VFCache of host device A, the SBMP server 205 will send a notification to the SBMP client 206 of host device A revoking the conflicting data in the VFCache of that device. Host device B can then safely overwrite the corresponding data on the shared disk.

The foregoing examples indicate that the SBMP server 205 coordinates the operation of multiple clients on respective host devices so as to ensure that each of the host devices has access to the most up-to-date data of the shared storage environment even though portions of that data may be periodically overwritten by other ones of the host devices. Absent such coordination by the SBMP server, the VFCache implemented on a given one of the host devices will not be able to ensure that its stored data remains consistent with the corresponding data in the shared storage environment.

Although not explicitly shown in FIG. 2B, an external cache may be arranged between host device 204-N and the storage array 202, as in the FIG. 1 embodiment. In an arrangement of this type, the SBMP server 205 may be implemented within the external cache rather than within the array controller 214. Alternatively, separate instances of the SBMP server 205 may be implemented in the external cache and the array controller.

Moreover, a given host device such as host device 204-N that does not include an installed VFCache can use a designated portion of its internal memory as a block cache and the SBMP server 205 can be configured to ensure coherency for any data from the shared storage environment that is stored in that internal memory. Such internal memory arrangements in host devices without an installed VFCache are intended to be encompassed by the term "block cache" as broadly used herein.

Modules such as module 210-1 and module 210-N may each be implemented at least in part in the form of one or more circuit cards that are installed in the corresponding host device 204-1 or 204-N.

The host devices 204 of storage system 200 may comprise computers or other types of processing devices. It should be noted that embodiments of the invention are not limited to use with host devices having any particular operating system. For example, embodiments of the invention can be implemented using host devices with Linux operating systems, Windows operating systems, or other types of operating systems, in any combination.

The embodiment illustrated in FIG. 2 provides significant improvements in the operation of the storage system 200 by incorporation of a VFCache 208 operating in conjunction with an SBMP client 206 in host device 204-1. As a result, the SBMP client 206 is provided with accelerated IO performance in a manner that significantly improves the overall performance of the storage system relative to conventional arrangements. Copies of recently-accessed data will reside in the flash-based VFCache 208 and can be used to satisfy read requests from the corresponding SBMP client 206 immediately without having to access the slower back-end storage array 202. Such a block caching arrangement also overcomes disadvantages that could otherwise arise if one were to attempt to perform caching in an operating system kernel of the associated host device 204-1.

Significant improvements are also obtained in terms of failure recovery. For example, an SBMP client can invalidate its associated VFCache under designated failure conditions, thereby preventing stale data from being read. Moreover, the VFCache can automatically repush data upon restart of the SBMP client, thereby reducing latency on failure recovery.

As noted above, the VFCache 208 may be incorporated into only a subset of the host devices 204. However, it is expected that maximum benefit relative to conventional practice is achieved when all host devices are configured to include SBMP clients 206 having a corresponding VFCache 208 as illustrated in module 210-1.

Figure 3:
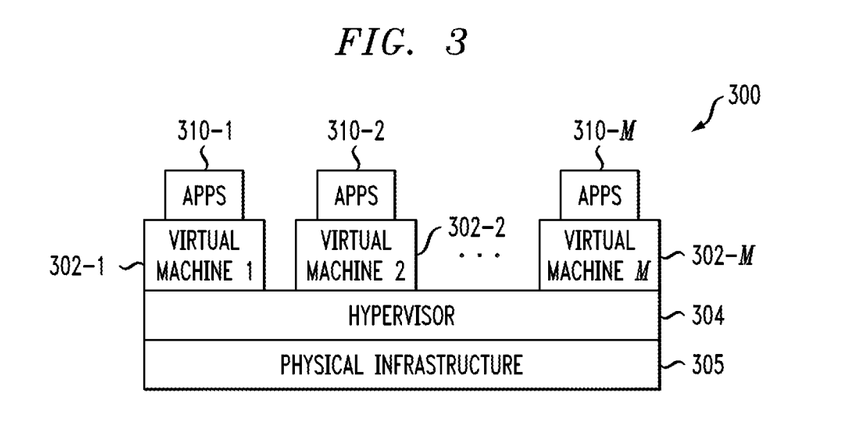
FIGS. 3 and 4 show examples of processing platforms that may be utilized to implement at least a portion of the systems of FIGS. 1 and 2.

Referring now to FIG. 3, portions of the storage system 100 or 200 may comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304.

Although only a single hypervisor 304 is shown in the embodiment of FIG. 3, the system 100 or 200 may of course include multiple hypervisors each providing a set of virtual machines using at least one underlying physical machine.

An example of a commercially available hypervisor platform that may be used to implement hypervisor 304 and possibly other portions of the cloud infrastructure of storage system 100 or 200 in one or more embodiments of the invention is the VMware® vSphere™ which may have an associated virtual infrastructure management system such as the VMware® vCenter™.

As indicated previously, the system 100 or 200 may be implemented using one or more processing platforms. One or more of the processing modules or other components of system 100 or 200 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
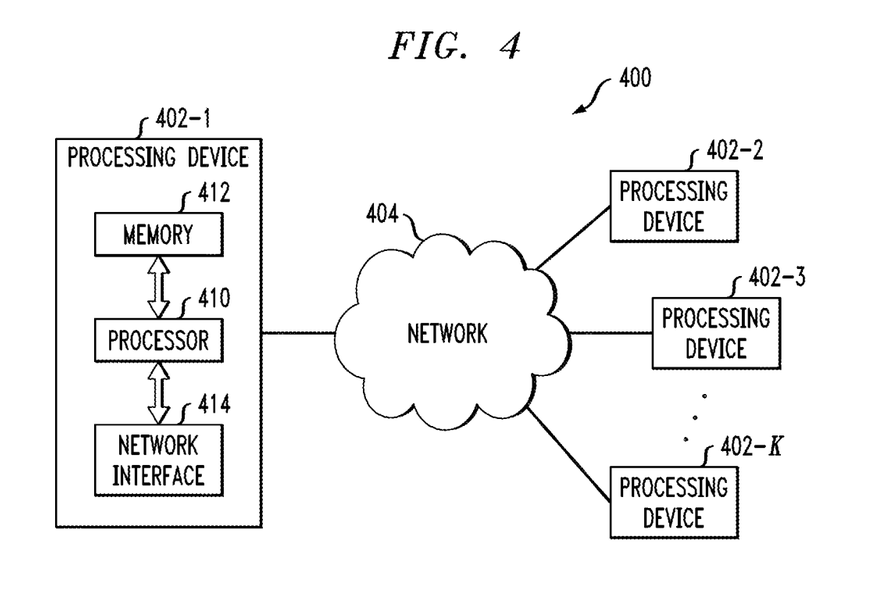

The processing platform 400 in this embodiment comprises a portion of system 100 or 200 and includes a plurality of processing devices, denoted 402-1, 402-2, 402-3, ... 402-K, which communicate with one another over a network 404.

The network 404 may comprise any type of network, including by way of example a global computer network such as the Internet, a wide area network (WAN), a local area network (LAN), a satellite network, a telephone or cable network, a cellular network, a wireless network such as WiFi or WiMAX, or various portions or combinations of these and other types of networks.

The processing device 402-1 in the processing platform 400 comprises a processor 410 coupled to a memory 412. The processor 410 may comprise a microprocessor, a microcontroller, an application-specific integrated circuit (ASIC), a field-programmable gate array (FPGA) or other type of processing circuitry, as well as portions or combinations of such circuitry elements, and the memory 412, which may be viewed as an example of a "computer program product" having executable computer program code embodied therein, may comprise random access memory (RAM), read-only memory (ROM) or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and storage system 100 or 200 may include additional or alternative processing platforms, as well as numerous distinct processing platforms in any combination, with each such platform comprising one or more computers, servers, storage devices or other processing devices.

As indicated above, storage system functionality such as that described in conjunction with FIGS. 1 and 2 can be implemented at least in part in the form of one or more software programs stored in memory and executed by a processor of a processing device such as a computer or server. A memory or other storage device having such program code embodied therein is an example of what is more generally referred to herein as a "computer program product." Certain system components are implemented using a combination of software and hardware. For example, a given VFCache 208 comprises software in combination with flash memory. Other types of block caches used in embodiments of the invention may be configured in a similar manner.

It should again be emphasized that the above-described embodiments of the invention are presented for purposes of illustration only. Many variations and other alternative embodiments may be used. For example, the disclosed techniques are applicable to a wide variety of other types of storage systems and devices that can benefit from acceleration of IO operations using block caching as described herein. Also, the particular configurations of system and device elements shown in FIGS. 1 and 2 can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
a shared storage environment comprising a storage array having at least one storage volume shared between first and second host devices;
a server associated with the storage array and external to the first and second host devices;
at least first and second clients implemented on the respective first and second host devices; and
a first block cache located between the first client and the storage array, wherein the first block cache is implemented externally to the storage array;
wherein the first client communicates with the storage array over at least first and second distinct paths, the first path connecting the first client to the storage array via the server and bypassing the first block cache, and the second path connecting the first client to the storage array via the first block cache and bypassing the server;
wherein the server is configured to coordinate operations of the first and second clients relating to the storage volume shared between the first and second host devices in a manner that ensures coherency of data blocks stored in the first block cache;
wherein a given set of data blocks of the storage volume shared between the first and second host devices is stored in the first block cache;
wherein the server is configured, responsive to the second client writing to the given set of data blocks in the storage volume shared between the first and second host devices, to provide a notification to the first client over the first path;
wherein the first client is configured to invalidate the given set of data blocks stored in the first block cache responsive to receiving the notification;
wherein the first block cache comprises a read-enabled write-through cache;
wherein the first client performs input/output operations with the storage array over the second path, the input/output operations comprising at least one of a read operation and a write operation;
wherein the read operation comprises attempting to read one or more data blocks of the one or more files from the first block cache and reading the one or more data blocks from the storage array responsive to the one or more data blocks not being available in the first block cache;
wherein the write operation comprises writing one or more data blocks to the storage array and caching the one or more data blocks in the first block cache;
wherein the first block cache is an internal block cache of the first host device;
wherein the first client comprises a storage block mapping protocol (SBMP) client implemented on the first host device;
wherein the server comprises a SBMP server implemented on an array controller of the storage array; and wherein the SBMP client and the SBMP server are configured for communication using a file mapping protocol (FMP).

2. The apparatus of claim 1 wherein the first block cache is not configured to grant or revoke locks on data blocks in the shared storage volume.

3. The apparatus of claim 2 wherein the server is configured to coordinate the operations of the first and second clients relating to the storage volume shared between the first and second host devices by granting locks to respective ones of the first and second clients on data blocks in the shared storage volume.

4. The apparatus of claim 1 wherein the first client performs file operations with the storage array over the first path.

5. The apparatus of claim 4 wherein the file operations comprise obtaining file layout information for the shared storage volume.

6. The apparatus of claim 4 wherein the file operations comprise obtaining at least one of file names, directory structure and access permissions for the shared storage volume.

7. The apparatus of claim 1 wherein the second client comprises an additional SBMP client implemented on the second host device.

8. The apparatus of claim 1 further comprising a second block cache arranged between the second client and the storage array.

9. The apparatus of claim 8 wherein the server is configured to coordinate operations of the first and second clients relating to the storage volume shared between the first and second host devices in a manner that ensures coherency of data stored in the first block cache and ensures coherency of data stored in the second block cache.

10. The apparatus of claim 1 wherein the block cache comprise a server flash cache.

11. A processing platform that incorporate the apparatus of claim 1.

12. The apparatus of claim 1 wherein:
the SBMP client is coupled to the internal block cache; and
the internal block cache is coupled to the storage array via one or more block input/output (TO) drivers.

13. The apparatus of claim 1 wherein the internal block cache comprises a designated portion of an internal memory of the first host device.

14. The apparatus of claim 1 wherein the SBMP client is configured to invalidate data blocks stored in the internal block cache responsive to detecting one or more designated failure conditions.

15. The apparatus of claim 1 wherein the internal block cache is configured to automatically repush data blocks stored therein to the storage volume shared between the first and second host devices responsive to detecting a restart of the SBMP client.

16. A method comprising:
configuring a storage array of a shared storage environment to include at least one storage volume shared between first and second host devices having respective first and second clients implemented thereon; and
coordinating operations of the first and second clients relating to the storage volume shared between the first and second host devices in a manner that ensures coherency of data stored in a first block cache located between the first client and the storage array;
wherein the first block cache is implemented externally to the storage array;

wherein the first client communicates with the storage array over at least first and second distinct paths, the first path connecting the first client to the storage array via a server and bypassing the first block cache, and the second path connecting the first client to the storage array via the first block cache and bypassing the server;
wherein the server is associated with the storage array and external to the first and second host devices;
wherein a given set of data blocks of the storage volume shared between the first and second host devices is stored in the first block cache;
wherein the server is configured, responsive to the second client writing to the given set of data blocks in the storage volume shared between the first and second host devices, to provide a notification to the first client over the first path;
wherein the first client is configured to invalidate the given set of data blocks stored in the first block cache responsive to receiving the notification;
wherein the first block cache comprises a read-enabled write-through cache;
wherein the first client performs input/output operations with the storage array over the second path, the input/output operations comprising at least one of a read operation and a write operation;
wherein the read operation comprises attempting to read one or more data blocks of the one or more files from the first block cache and reading the one or more data blocks from the storage array responsive to the one or more data blocks not being available in the first block cache;
wherein the write operation comprises writing one or more data blocks to the storage array and caching the one or more data blocks in the first block cache;
wherein the first block cache is an internal block cache of the first host device;
wherein the first client comprises a storage block mapping protocol (SBMP) client implemented on the first host device;
wherein the server comprises a SBMP server implemented on an array controller of the storage array; and
wherein the SBMP client and the SBMP server are configured for communication using a file mapping protocol (FMP).

17. The method of claim 16 wherein the first block cache is not configured to grant or revoke locks on data blocks in the shared storage volume, and wherein coordinating the operations of the first and second clients relating to the storage volume shared between the first and second host devices comprises granting locks to respective ones of the first and second clients on data blocks in the shared storage volume.

18. The method of claim 16 wherein the first client performs file operations with the storage array over the first path.

19. A computer program product comprising a non-transitory processor-readable storage medium having encoded therein executable code of one or more software programs, wherein the one or more software programs when executed cause a processing platform:
to configure a storage array of a shared storage environment to include at least one storage volume shared between first and second host devices having respective first and second clients implemented thereon; and
to coordinate operations of the first and second clients relating to the storage volume shared between the first and second host devices in a manner that ensures coherency of data stored in a first block cache located between the first client and the storage array;

wherein the first block cache is implemented externally to the storage array;

wherein the first client communicates with the storage array over at least first and second distinct paths, the first path connecting the first client to the storage array via a server and bypassing the first block cache, and the second path connecting the first client to the storage array via the first block cache and bypassing the server;

wherein the server is associated with the storage array and external to the first and second host devices;

wherein a given set of data blocks of the storage volume shared between the first and second host devices is stored in the first block cache;

wherein the server is configured, responsive to the second client writing to the given set of data blocks in the storage volume shared between the first and second host devices, to provide a notification to the first client over the first path;

wherein the first client is configured to invalidate the given set of data blocks stored in the first block cache responsive to receiving the notification;

wherein the first block cache comprises a read-enabled write-through cache;

wherein the first client performs input/output operations with the storage array over the second path, the input/output operations comprising at least one of a read operation and a write operation;

wherein the read operation comprises attempting to read one or more data blocks of the one or more files from the first block cache and reading the one or more data blocks from the storage array responsive to the one or more data blocks not being available in the first block cache;

wherein the write operation comprises writing one or more data blocks to the storage array and caching the one or more data blocks in the first block cache;

wherein the first block cache is an internal block cache of the first host device;

wherein the first client comprises a storage block mapping protocol (SBMP) client implemented on the first host device;

wherein the server comprises a SBMP server implemented on an array controller of the storage array; and wherein the SBMP client and the SBMP server are configured for communication using a file mapping protocol (FMP).

20. The computer program product of claim 19 wherein the first block cache is not configured to grant or revoke locks on data blocks in the shared storage volume, and wherein coordinating the operations of the first and second clients relating to the storage volume shared between the first and second host devices comprises granting locks to respective ones of the first and second clients on data blocks in the shared storage volume.

* * * * *

UNITED STATES PATENT AND TRADEMARK OFFICE
CERTIFICATE OF CORRECTION

PATENT NO. : 10,481,808 B1
APPLICATION NO. : 15/585771
DATED : November 19, 2019
INVENTOR(S) : Gang Ma et al.

Page 1 of 1

It is certified that error appears in the above-identified patent and that said Letters Patent is hereby corrected as shown below:

In the Specification

Column 1, Line 21 please delete "(TO)" and insert therefor --(IO)--

In the Claims

Claim 11, Column 11, Line 37 please delete "incorporate" and insert therefor --incorporates--

Claim 12, Column 11, Line 43 please delete "(TO)" and insert therefor --(IO)--

Signed and Sealed this
Fourteenth Day of January, 2020

Andrei Iancu
*Director of the United States Patent and Trademark Office*